US008918327B2

(12) United States Patent
Hirakawa et al.

(10) Patent No.: US 8,918,327 B2
(45) Date of Patent: Dec. 23, 2014

(54) CUSTOMER SERVICE STATUS ANALYSIS DEVICE, CUSTOMER SERVICE STATUS ANALYSIS SYSTEM AND CUSTOMER SERVICE STATUS ANALYSIS METHOD

(71) Applicant: Panasonic Corporation, Osaka (JP)

(72) Inventors: Kunio Hirakawa, Kanagawa (JP); Yoshinobu Uno, Kanagawa (JP); Yuichi Nakahata, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/166,030

(22) Filed: Jan. 28, 2014

(65) Prior Publication Data

US 2014/0222479 A1     Aug. 7, 2014

(30) Foreign Application Priority Data

Feb. 1, 2013   (JP) .................................. 2013-018197

(51) Int. Cl.
    *G06F 17/00*          (2006.01)
(52) U.S. Cl.
    USPC ........................................................ 705/7.15
(58) Field of Classification Search
    USPC ........................................................ 705/7.15
    See application file for complete search history.

(56) References Cited

U.S. PATENT DOCUMENTS

| | | | | |
|---|---|---|---|---|
| 5,953,055 | A * | 9/1999 | Huang et al. ................... | 348/155 |
| 7,257,547 | B1 | 8/2007 | Terase | |
| 2003/0204444 | A1 * | 10/2003 | Van Luchene et al. ......... | 705/16 |
| 2004/0260513 | A1 | 12/2004 | Fitzpatrick et al. | |
| 2005/0030162 | A1 * | 2/2005 | Stambaugh .............. | 340/286.09 |
| 2009/0252318 | A1 * | 10/2009 | Smith et al. ................. | 379/265.1 |
| 2009/0287550 | A1 | 11/2009 | Jennings | |
| 2011/0225032 | A1 * | 9/2011 | Kobres ........................ | 705/14.27 |

FOREIGN PATENT DOCUMENTS

| | | |
|---|---|---|
| JP | 8-16658 | 1/1996 |
| JP | 2002-279154 | 9/2002 |
| JP | 2003-123153 | 4/2003 |
| JP | 2007-328385 | 12/2007 |
| JP | 2008-129750 | 6/2008 |
| JP | 2011-008454 | 1/2011 |
| JP | 2011-76352 | 4/2011 |

OTHER PUBLICATIONS

Japan Office Action, dated Mar. 26, 2013 along with an English translation thereof.
Extended European Search Report, dated Apr. 10, 2014, in corresponding European Patent Application No. 14152938.8.

* cited by examiner

*Primary Examiner* — Thomas Dixon
(74) *Attorney, Agent, or Firm* — Greenblum & Bernstein, P.L.C.

(57) ABSTRACT

A customer service status analysis device includes: a first time obtaining unit configured to detect occurrence of a prescribed customer service event and obtain an occurrence time of the prescribed customer service event based on image information provided by an imaging device capturing images of an interior of a commercial establishment; a second time obtaining unit configured to obtain an occurrence time of a prescribed customer service event from a sales information management device; a time period information obtaining unit configured to obtain time period information relating to customer service based on the occurrence time of the customer service event obtained by the first time obtaining unit and the occurrence time of the customer service event obtained by the second time obtaining unit; and an output information generation unit configured to generate output information representing a result of analysis based on the time period information.

15 Claims, 7 Drawing Sheets

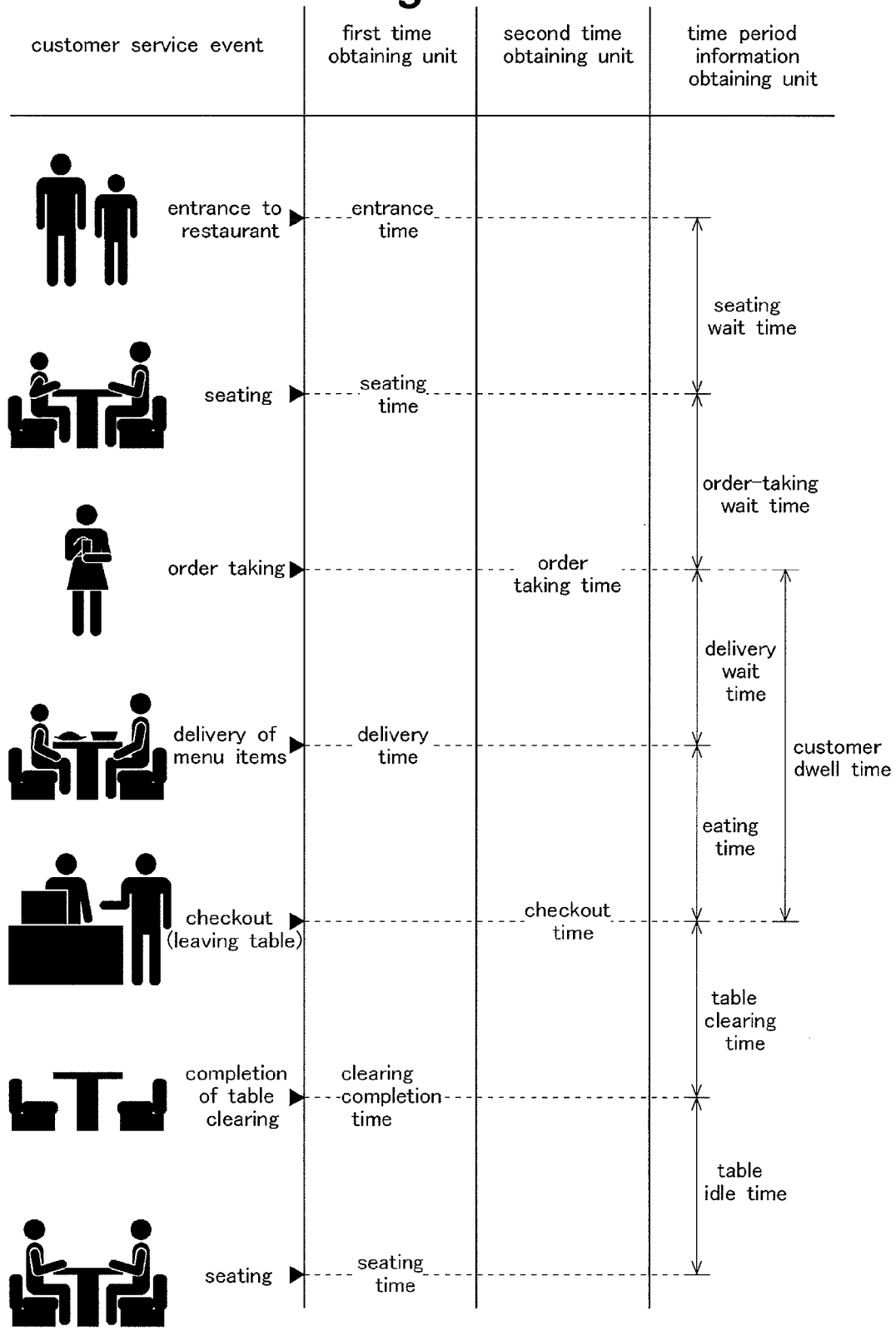

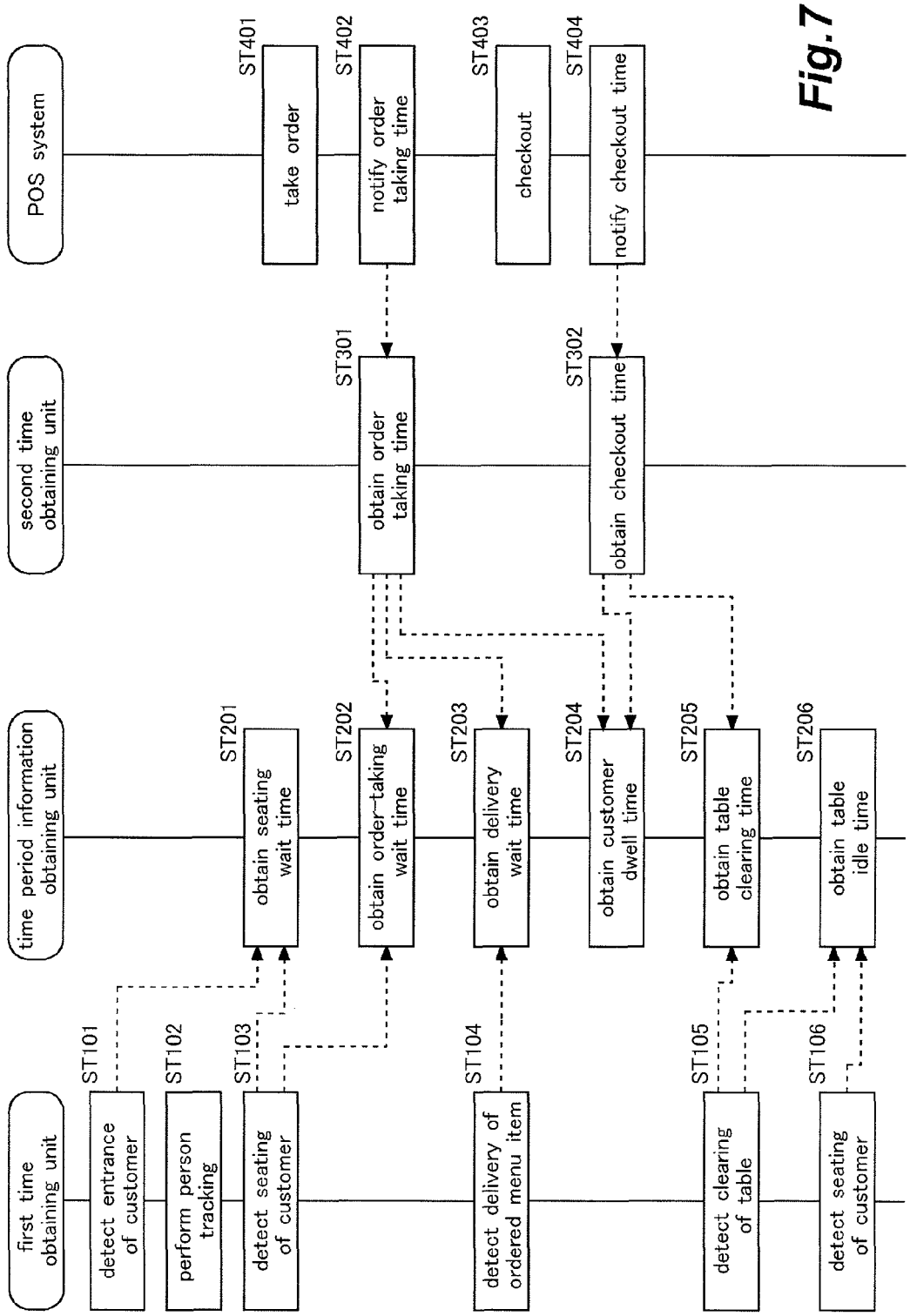

CUSTOMER SERVICE STATUS ANALYSIS DEVICE, CUSTOMER SERVICE STATUS ANALYSIS SYSTEM AND CUSTOMER SERVICE STATUS ANALYSIS METHOD

TECHNICAL FIELD

The present invention relates to a customer service status analysis device, customer service status analysis system and customer service status analysis method for performing analysis of the customer service status of a commercial establishment.

BACKGROUND OF THE INVENTION

In a restaurant such as a casual dining restaurant, developing measures for improving the operation of the restaurant based on a result of analysis of the status of customer service provided by the restaurant staff is beneficial to improve the customer satisfaction and streamline the operation of the restaurant, thereby increasing the sales and profit of the restaurant.

In connection with the status of customer service at a restaurant, there is conventionally known a technology that uses mobile terminals held by staff members to show each staff member a procedure to be followed when delivering menu items to a table and/or to notify the staff member of a timing to clear up the table (see JP2007-328385A).

In a restaurant such as a casual dining restaurant, various wait times, in which a customer must wait for service, may occur during the time from when the customer enters the restaurant to when the customer leaves the restaurant, and these wait times reduce customer satisfaction and may result in complaints from customers. Therefore, knowing the actual state of wait times and developing improvement measures for reducing the wait times can contribute to avoiding complaints from customers and improving customer satisfaction. Further, this can increase the customer turnover rate and streamline the operation of the restaurant, thereby improving the sales and profit of the restaurant.

However, the conventional technology only has a function of providing instructions to restaurant staff members to enable or assist the staff members to perform work accurately and promptly, and is not specifically designed to achieve a purpose of obtaining information that makes it possible to know the actual customer service status of the restaurant.

In the conventional technology, restaurant staff members perform input operations not only when they take orders from customers or when they check out customers, but also when they deliver ordered menu items to tables, and thus, it may be conceived to obtain information that can represent the actual customer service status from the information input by restaurant staff members. However, to obtain information representing the actual customer service status in detail, it is necessary for the staff members to frequently perform input operations, and this would increase the burden on the staff members. Therefore, technology is desired that can make it possible to know the actual customer service status without requiring staff members to perform cumbersome work such as input operations.

SUMMARY OF THE INVENTION

The present invention is made to solve the foregoing problems in the prior art, and a primary object of the present invention is to provide a customer service status analysis device, customer service status analysis system and customer service status analysis method configured to allow a user, such as a manager of a commercial establishment, to know the actual customer service status of the commercial establishment easily and in detail.

To achieve the foregoing object, in a first aspect of the present invention, there is provided a customer service status analysis device for performing analysis of customer service status of a commercial establishment, including: a first time obtaining unit configured to detect occurrence of a prescribed customer service event and obtain an occurrence time of the prescribed customer service event based on image information provided by an imaging device capturing images of an interior of the commercial establishment; a second time obtaining unit configured to obtain an occurrence time of a prescribed customer service event from a sales information management device that manages sales information; a time period information obtaining unit configured to obtain, as a required time period relating to customer service, a time period elapsed from an occurrence time of a customer service event serving as a starting point to an occurrence time of a customer service event serving as an ending point, based on the occurrence time of the customer service event obtained by the first time obtaining unit and the occurrence time of the customer service event obtained by the second time obtaining unit; and an output information generation unit configured to generate output information representing a result of analysis based on the required time period obtained by the time period information obtaining unit, wherein the first time obtaining unit obtains one of the occurrence time of the customer service event serving as a starting point and the occurrence time of the customer service event serving as an ending point, and the second time obtaining unit obtains the other of the occurrence time of the customer service event serving as a starting point and the occurrence time of the customer service event serving as an ending point.

According to this structure, an occurrence time of a customer service event that cannot be obtained from the sales information provided by the sales information management device can be obtained from the image information provided by the imaging device, and thus, it is possible to obtain occurrence times of more customer service events taking place in the commercial establishment. Therefore, it is possible to output a result of detailed analysis of customer service status, thereby allowing a user such as a manager of the commercial establishment to know the actual customer service status of the commercial establishment easily and in detail.

In a second aspect of the present invention, the first time obtaining unit obtains a time when a customer is seated at a table, the second time obtaining unit obtains a time when an order is taken from the customer by a staff member, and the time period information obtaining unit obtains an order-taking wait time as a time period elapsed from the time when the customer is seated to the time when the order is taken from the customer.

According to this structure, a user such as a manager of the commercial establishment is enabled to know the order-taking wait time.

In a third aspect of the present invention, the second time obtaining unit obtains a time when a customer checks out, the first time obtaining unit obtains a time when clearing of a table used by the customer is completed, and the time period information obtaining unit obtains a table clearing time as a time period elapsed from the time when the customer checks out to the time when clearing of the table used by the customer is completed.

According to this structure, a user such as a manager of the commercial establishment is enabled to know the table clearing time.

In a fourth aspect of the present invention, the second time obtaining unit obtains a time when a staff member takes an order from a customer, the first time obtaining unit obtains a time when the staff member delivers an ordered menu item to a table at which the customer is seated, and the time period information obtaining unit obtains a delivery wait time as a time period elapsed from the time when the order of the customer is taken to the time when the ordered menu item is delivered to the table.

According to this structure, a user such as a manager of the commercial establishment is enabled to know the delivery wait time.

In a fifth aspect of the present invention, the first time obtaining unit obtains a time when a staff member delivers a menu item ordered by a customer to a table at which the customer is seated, the second time obtaining unit obtains a time when the customer checks out, and the time period information obtaining unit obtains an eating time as a time period elapsed from when the menu item is delivered to the table to the time when the customer checks out.

According to this structure, a user such as a manager of the commercial establishment is enabled to know the eating time.

In a sixth aspect of the present invention, the customer service status analysis device further includes a totaling unit configured to total, for each predetermined time period, the required time period obtained by the time period information obtaining unit, and obtain an average required time period for each predetermined time period, wherein the output information generation unit generates the output information based on the average required time period for each predetermined time period obtained by the totaling unit.

According to this structure, a user such as a manager of the commercial establishment is enabled to know the required time period relating to customer service for each predetermined time period.

In a seventh aspect of the present invention, the customer service status analysis device further includes a totaling unit configured to total the required time period obtained by the time period information obtaining unit from a plurality of commercial establishment such that the required time period is totaled for each commercial establishment, and obtain an average required time period for each commercial establishment, wherein the output information generation unit generates the output information based on the average required time period for each commercial establishment obtained by the totaling unit.

According to this structure, a user such as a manager of a management office is enabled to know the required time period relating to customer service of each commercial establishment.

In an eighth aspect of the present invention, there is provided a customer service status analysis system for performing analysis of customer service status of a commercial establishment, including: an imaging device capturing images of an interior of the commercial establishment; a sales information management device configured to manage sales information; and a plurality of information processing devices, wherein the plurality of information processing devices jointly include: a first time obtaining unit configured to detect occurrence of a prescribed customer service event and obtain an occurrence time of the prescribed customer service event based on image information provided by the imaging device; a second time obtaining unit configured to obtain an occurrence time of a prescribed customer service event from the sales information management device; a time period information obtaining unit configured to obtain, as a required time period relating to customer service, a time period elapsed from an occurrence time of a customer service event serving as a starting point to an occurrence time of a customer service event serving as an ending point, based on the occurrence time of the customer service event obtained by the first time obtaining unit and the occurrence time of the customer service event obtained by the second time obtaining unit; and an output information generation unit configured to generate output information representing a result of analysis based on the required time period obtained by the time period information obtaining unit, wherein the first time obtaining unit obtains one of the occurrence time of the customer service event serving as a starting point and the occurrence time of the customer service event serving as an ending point, and the second time obtaining unit obtains the other of the occurrence time of the customer service event serving as a starting point and the occurrence time of the customer service event serving as an ending point.

According to this structure, a user such as a manager of a commercial establishment is enabled to know the actual customer service status easily and in detail, similarly to the structure according to the first aspect of the present invention.

In a ninth aspect of the present invention, one of the information processing devices is set up at the commercial establishment and includes at least the first time obtaining unit.

According to this feature, since the information obtained by the first time obtaining unit has a small amount of data, even if the other units, such as the second time obtaining unit, time period information obtaining unit, and output information generation unit, are provided to another information processing device set up at a place other than the commercial establishment, such as at a management office overseeing multiple commercial establishments, the communication load can be small. Thus, it is easy to operate the system in the form of a wide area network.

In a tenth aspect of the present invention, one of the information processing devices constitutes a cloud computing system and includes at least the first time obtaining unit.

According to this structure, although the process executed by the first time obtaining unit requires a large amount of computation, this is achieved by an information processing device constituting a cloud computing system, and therefore, it is not necessary to prepare a high-speed information processing device on the user side; namely, at the commercial establishment or the like. Further, since the process executed by the other units; namely, the second time obtaining unit, time period information obtaining unit, and output information generation unit requires a small amount of computation, the functions of these units can be implemented as extended functions of an information processing device set up at the commercial establishment to serve as the sales information management device, and this can reduce the cost born by the user.

In an eleventh aspect of the present invention, there is provided a customer service status analysis method for performing analysis of customer service status of a commercial establishment by an information processing device set up inside or outside the commercial establishment, including: a first time obtaining step for detecting occurrence of a prescribed customer service event and obtaining an occurrence time of the prescribed customer service event based on image information provided by an imaging device capturing an interior of the commercial establishment; a second time obtaining step for obtaining an occurrence time of a prescribed customer service event from a sales information management device that manages sales information; a time period information obtaining step for obtaining, as a required time period relating to customer service, a time period elapsed from an occurrence time of a customer service event serving as a starting point to an occurrence time of a customer service event serving as an ending point, based on the occurrence time of the customer service event obtained by the first time obtaining step and the occurrence time of the customer service event obtained by the second time obtaining step; and an output information generation step for generating output information representing a result of analysis based on the required time period obtained by the time period information obtaining step, wherein the first time obtaining step obtains one of the occurrence time of the customer service event serving as a starting point and the occurrence time of the customer service event serving as an ending point, and the second time obtaining step obtains the other of the occurrence time of the customer service event serving as a starting point and the occurrence time of the customer service event serving as an ending point.

According to this structure, a user such as a manager of the commercial establishment is enabled to know the actual customer service status easily and in detail, similarly to the structure according to the first aspect of the present invention.

BRIEF DESCRIPTION OF THE DRAWINGS

Now the present invention is described in the following in terms of preferred embodiments thereof with reference to the appended drawings, in which:

FIG. 6 is an explanatory diagram for explaining an outline of a process executed by a customer service status analysis unit 32; and FIG. 7 is a flowchart showing a procedure of the process executed by the customer service status analysis unit 32.

DETAILED DESCRIPTION OF THE PREFERRED EMBODIMENTS

In the following, description will be made of an exemplary embodiment of the present invention with reference to the drawings.

Figure 1:
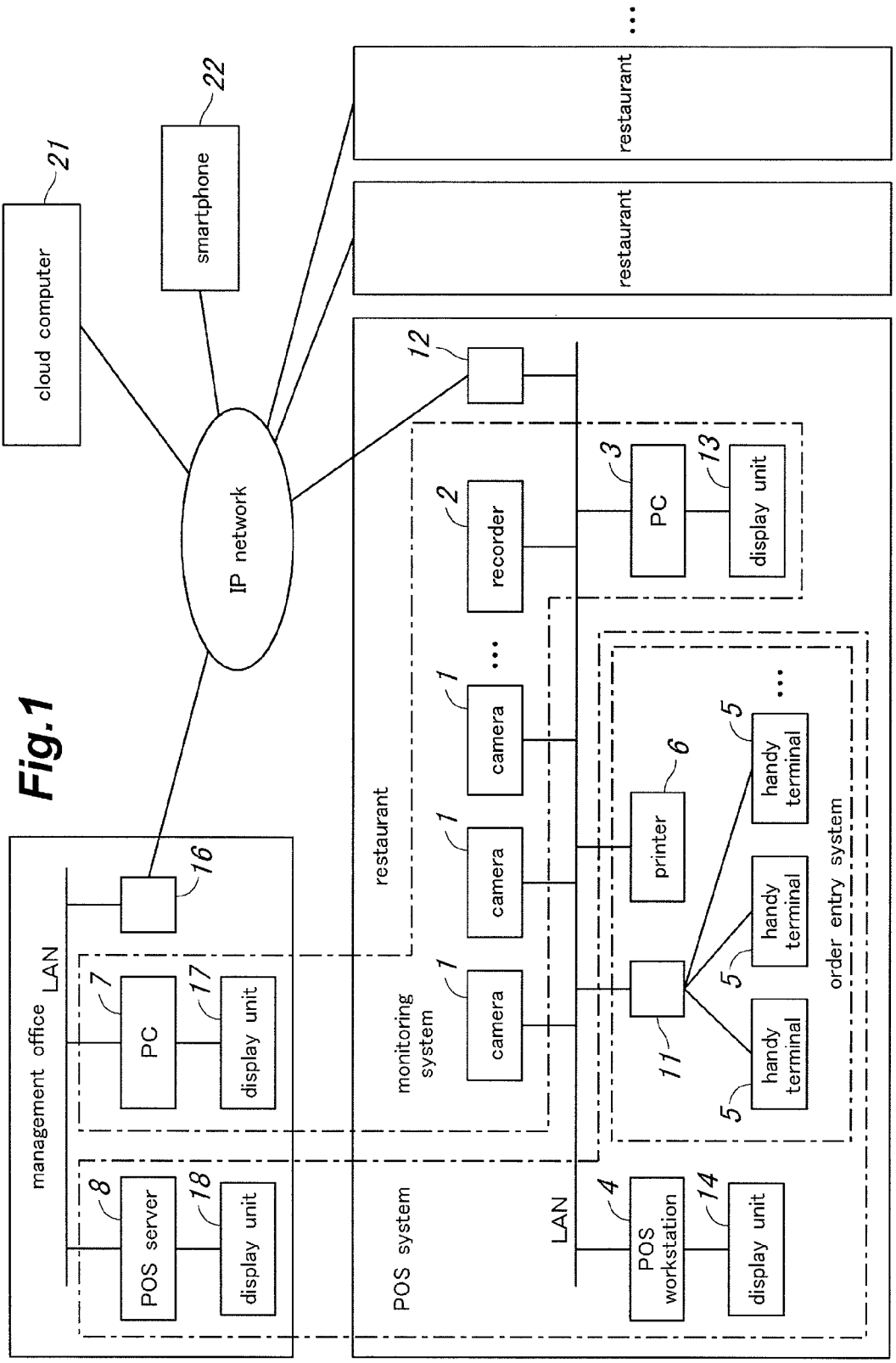
FIG. 1 is a diagram showing an overall structure of a customer service status analysis system according to an embodiment of the present invention.

FIG. 1 is a diagram showing an overall structure of a customer service status analysis system according to this embodiment. This customer service status analysis system is designed for a casual dining restaurant chain, for example, and includes cameras (imaging device) 1, a recorder (image recording device) 2, a personal computer (PC) (customer service status analysis device, browser device) 3, a point of sale (POS) workstation (sales information management device) 4, handy terminals (order entry device) 5, and a printer 6, which are set up at each of the multiple restaurants within the chain. Further, the customer service status analysis system includes a PC (customer service status analysis device, browser device) 7 and a POS server (sales information management device) 8, which are set up at a management office overseeing the multiple restaurants.

In each restaurant, the cameras 1, recorder 2, PC 3, POS workstation 4 and printer 6 are connected to a local area network (LAN) together with a wireless relay device 11 that relays the communication of the handy terminals 5 and a router 12 for connection with an Internet Protocol (IP) network. The PC 3 and the POS workstation 4 have respective display units (display devices) 13, 14 connected thereto. In the management office, the PC 7 and the POS server 8 are connected to a LAN together with a router 16 for connection with the IP network. The PC 7 and the POS server 8 have respective display units (display devices) 17, 18 connected thereto.

The cameras 1, recorder 2, PC 3 set up at each restaurant and PC 7 set up at the management office constitute a monitoring system for monitoring the interior of the restaurant. The cameras 1 are set up at appropriate locations in the restaurant to capture images of the various areas in the restaurant, and image information obtained thereby is recorded by the recorder 2. The PC 3 set up at the restaurant and the PC 7 set up at the management office can display the real-time images of various areas in the restaurant captured by the cameras 1 or the past images of various areas in the restaurant recorded by the recorder 2, and this allows a user at the restaurant or the management office to check the situation in the restaurant.

The handy terminals 5, wireless relay device 11 and printer 6 set up at each restaurant constitute an order entry system for accepting customer orders. Each handy terminal 5 is to be carried by a restaurant staff member (such as a waiter or a waitress), whereby the staff member, upon taking orders from customers, can enter the content of the orders (ordered menu items, number of orders for each menu item) into the handy terminal 5. The printer 6 is set up in the kitchen, and when the staff member enters order content into the handy terminal 5, the order content is output from the printer 6 so that the order content is communicated to the kitchen staff.

The POS workstation 4 and the order entry system set up at each restaurant and the POS server 8 set up at the management office constitute a POS (point of sale) system that manages sales information relating to the sales of each restaurant. This POS system manages, as the sales information, order content, order time, checkout time, order method, number of customers, etc. This sales information is shared between the POS workstation 4 and the POS server 8. The POS workstation 4 manages the sales information of the restaurant at which the POS workstation 4 is set up, and the POS server 8 manages the sales information of all member restaurants under its management.

Each handy terminal 5 constituting the order entry system is adapted to allow the restaurant staff member to enter order information other than the order content (ordered menu items, number of orders for each menu item), such as a number of customers sitting at a table, table number (seat number), etc., and the order information entered is transmitted to the POS workstation 4. In addition to the function for managing the sales information, the POS workstation 4 has a register function for performing checkout, and is set up at the checkout counter. This POS workstation 4 is connected with a cash drawer and a receipt printer not shown in the drawings. The POS workstation 4 generates sales information based on the order information transmitted from the handy terminals 5 and checkout information obtained at the time of checkout.

The PC 3 set up at the restaurant is configured to realize a customer service status analysis device that performs analysis of the customer service status of the restaurant. The analysis result information generated by the PC 3 set up at the restaurant can be displayed on the PC 3 itself, and also, is transmitted to the PC 7 set up at the management office, such that the information can be displayed on the PC 7. Thus, the PCs 3 and 7 are each configured to serve as a browser device that allows a user to view the analysis result information.

Figure 2:
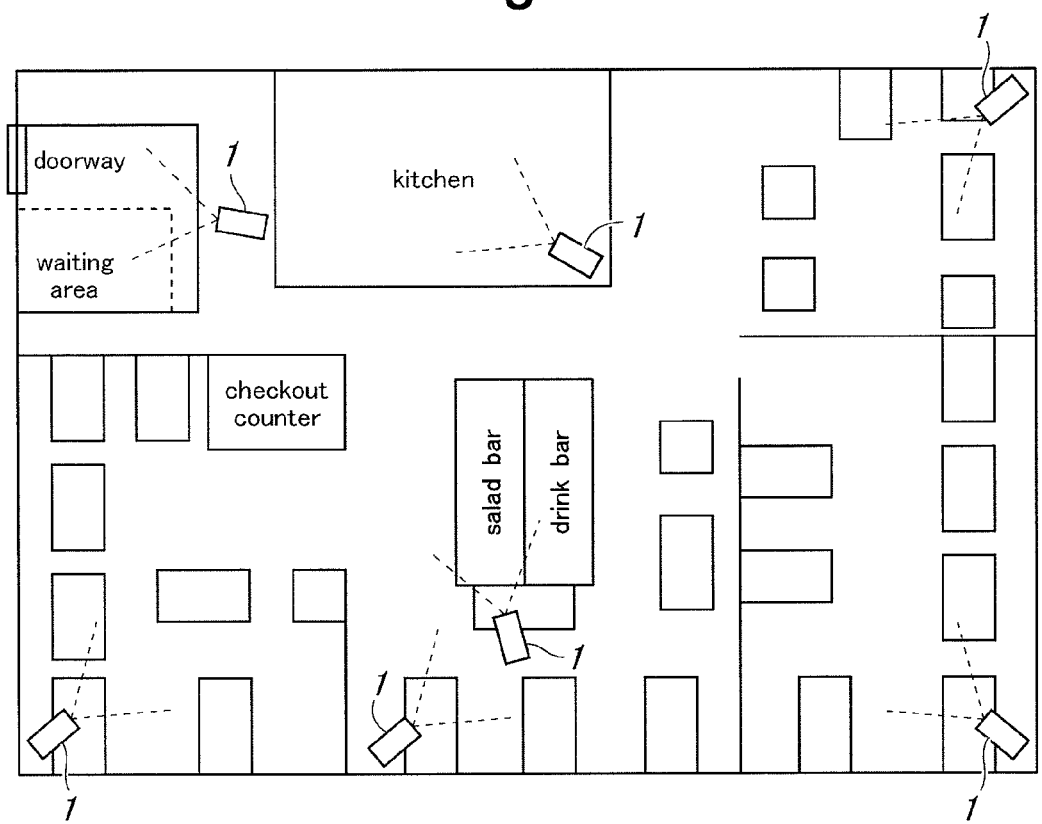
FIG. 2 is a plan view showing an example of an interior layout of a restaurant.

FIG. 2 is a plan view showing an example of an interior layout of a restaurant. The restaurant includes a doorway, a waiting area, a checkout counter, tables with seats, a salad bar, a drink bar, and a kitchen. The salad bar and the drink bar are a buffet-style table or counter on which salad components and drinks are provided, respectively, for customers to serve themselves. Further, multiple cameras 1 are set up at appropriate locations in the restaurant. Specifically, in the example shown in FIG. 2, the cameras 1 are set up to capture images at the doorway, tables, salad bar and kitchen.

Figure 3:
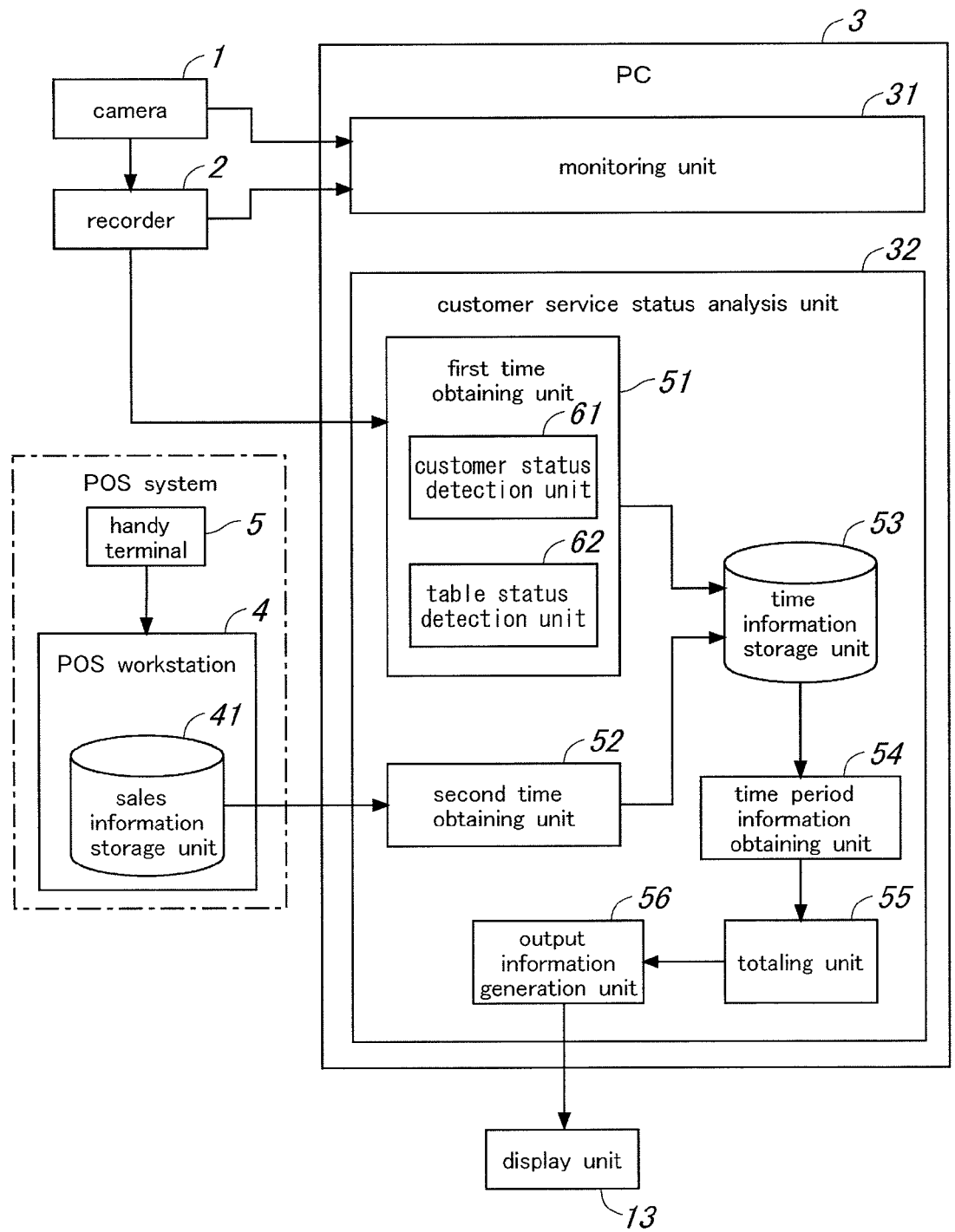
FIG. 3 is a block diagram schematically showing a functional structure of a PC 3 set up at the restaurant.

FIG. 3 is a block diagram schematically showing a functional structure of the PC 3 set up at a restaurant. The PC 3 includes a monitoring unit 31 and a customer service status analysis unit 32. The monitoring unit 31 allows the PC 3 to function as a monitoring system for monitoring the interior of the restaurant. The monitoring unit 31 controls the operation of the cameras 1 and the recorder 2 and enables a user to have a real-time view of the images of various areas in the restaurant captured by the cameras 1 and to view the images of various areas in the restaurant recorded in the recorder 2. The customer service status analysis unit 32 performs analysis of the customer service status of the restaurant.

It is to be noted that the monitoring unit 31 and the customer service status analysis unit 32 are realized by executing programs for monitoring and customer service status analysis by the CPU of the PC 3. These programs may be pre-installed in the PC 3 serving as an information processing device to embody a device dedicated for monitoring and customer service status analysis functions, or may be provided to a user in the form stored in an appropriate recording medium as an application program that can be run on a general-purpose OS.

Next, description will be made of a customer service status analysis process executed by the customer service status analysis unit 32 of the PC 3 set up at a restaurant. In this customer service status analysis process, analysis of the customer service status of the restaurant is performed. Specifically, in the present embodiment, time period information relating to customer service status, such as a time period from the time a customer is seated at a table to the time an order is taken from the customer (order-taking wait time), is obtained, and analysis result information is generated based on the time period information.

Figure 4:
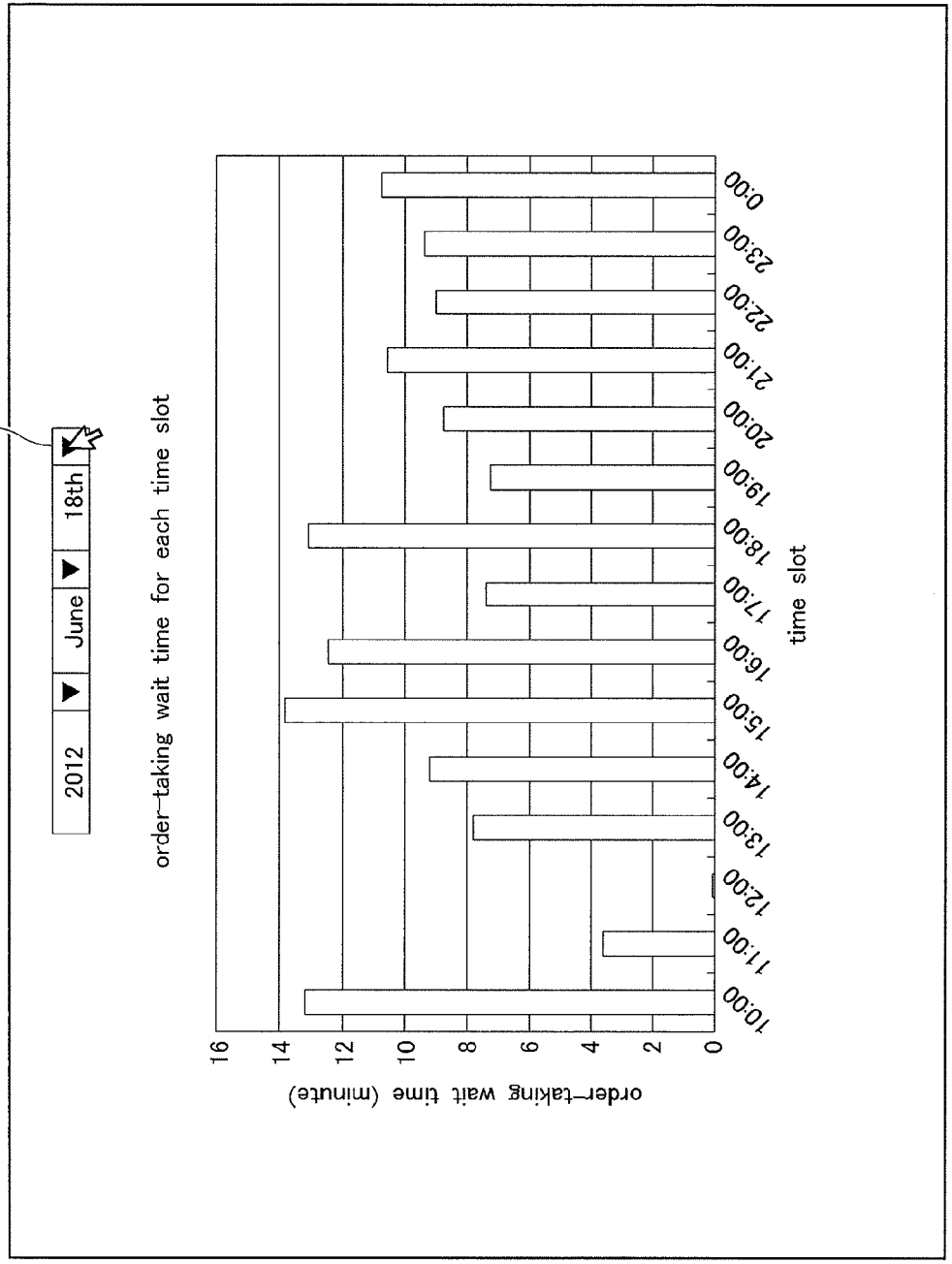
FIG. 4 is an explanatory diagram showing an example of an analysis result screen displaying analysis result information relating to customer service status.
Figure 5:
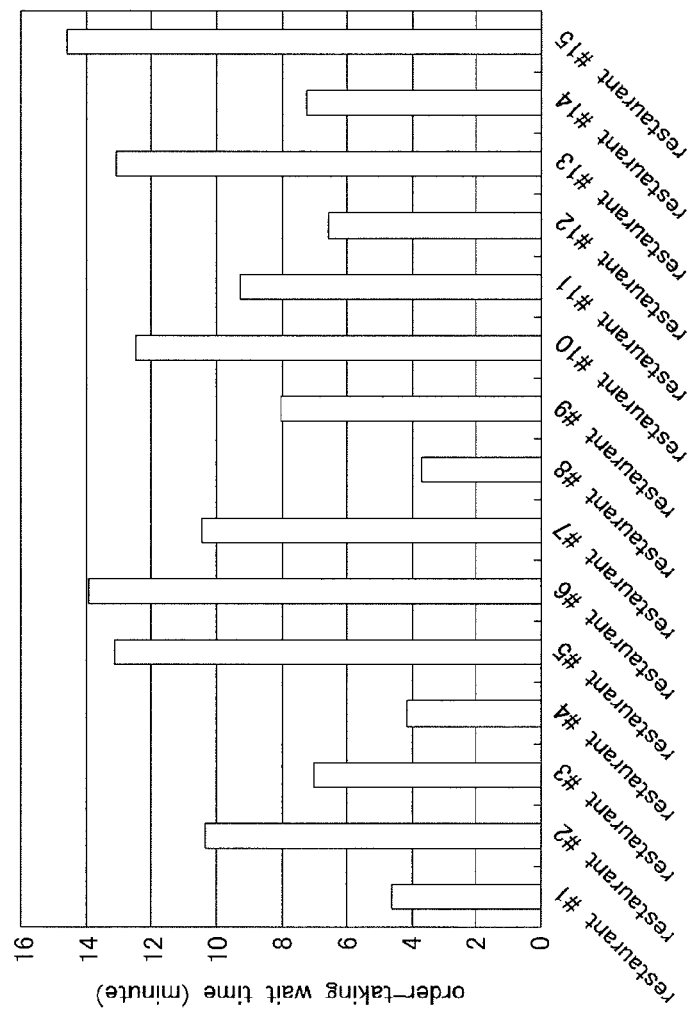
FIG. 5 is an explanatory diagram showing an example of an analysis result screen displaying analysis result information relating to customer service status.

FIGS. 4 and 5 are each an explanatory diagram showing an example of an analysis result screen displaying analysis result information relating to customer service status. The analysis result screen is to be displayed on the display unit 13 of the PC 3 set up at the restaurant and the display unit 17 of the PC 7 set up at the management office.

The analysis result screen shown in FIG. 4 includes a bar chart that shows, as the analysis result information relating to customer service status, an order-taking wait time for each time slot during opening hours of the restaurant (10:00 AM to 1:00 AM) on a designated date. From this analysis result screen, a user can understand the characteristics of a change in the order-taking wait time depending on the time slot. It is to be noted here that the order-taking wait time for each time slot is an average of the order-taking wait times for respective customers falling within the time slot. More specifically, in a case where the time a customer is seated at a table, which serves as a starting point of an order-taking wait time, falls within a certain time slot, the order-taking wait time may be determined to fall within this time slot. Alternatively, it is also possible that, in a case where the time an order is taken from a customer, which serves as an ending point of an order-taking wait time, falls within a certain time slot, the order-taking wait time may be determined to fall within this time slot. The same may also apply to other required time periods (such as a seating wait time, delivery wait time, etc.) which will be described in the following.

The analysis result screen shown in FIG. 5 includes a bar chart that shows, as the analysis result information relating to customer service status, a daily averaged order-taking wait time of each restaurant on a designated date. With this analysis result screen, a user can compare the order-taking wait times of different restaurants and understand a difference in the average order-taking wait time between the restaurants. It is to be noted here that the PC 3 of each restaurant can obtain data necessary to display the daily averaged order-taking wait time of other restaurants from the PC 7 or POS server 8 set up at the management office or the PC 3 set up at other restaurants via the IP network (see FIG. 1). Namely, the PC 3 includes a communication unit configured to receive information representing a daily averaged order-taking wait time (required time period relating to customer service) of another restaurant (commercial establishment).

The analysis result screens shown in FIGS. 4 and 5 further include operation elements 71 and 81, respectively, for designating a year, month and day so that the user can choose a date by operating the operation elements 71 and 81 and view the analysis result on the chosen date.

It is to be noted that, in a case where the analysis result screen shown in FIG. 4 is displayed on the display unit 17 of the PC 7 set up at the management office, an operation element for selecting a restaurant is preferably displayed in the analysis result screen so that the user can view the analysis result of the restaurant selected by operating the operation element.

Further, though the analysis result screen shown in FIG. 5 displays the order-taking wait time averaged over a day, it may display an order-taking wait time averaged over a designated time slot. In this case, it is preferred that an operation element for changing the time slot be included in the analysis result screen, such that the use can view the analysis result of a desired time slot by operating the operation element.

Further, though each of the analysis result screens shown in FIGS. 4 and 5 displays the order-taking wait time as time period information relating to customer service status, as will be described in detail in the following, other time periods, such as a time period from the time a customer enters a restaurant to the time the customer is ushered to a seat (seating wait time), are obtained in addition to the order-taking wait time as various pieces of time period information relating to customer service status in the present embodiment, and analysis result screens similar to those shown in FIGS. 4 and 5 may be displayed to show these pieces of time period information relating to customer service status.

The analysis result screens shown in FIGS. 4 and 5 are generated by the customer service status analysis unit 32 of the PC 3 set up at a restaurant, as shown in FIG. 3, and this customer service status analysis unit 32 includes a first time obtaining unit 51, a second time obtaining unit 52, a time information storage unit 53, a time period information obtaining unit 54, a totaling unit 55, and an output information generation unit 56.

FIG. 6 is an explanatory diagram for explaining an outline of a process executed by the customer service status analysis unit 32. FIG. 7 is a flowchart showing a procedure of the process executed by the customer service status analysis unit 32. In the following, the content of the process executed by the various units in the customer service status analysis unit 32 shown in FIG. 3 will be described with reference to FIGS. 6 and 7 as necessary.

As shown in FIG. 6, in the restaurant, various events relating to customer service (hereinafter, customer service events) may occur during the time from when a customer enters the restaurant to when the customer leaves the restaurant. In the present embodiment, the customer service events of interest include a customer entering the restaurant, a customer being seated at a table, a customer's order being taken by a staff member, a menu item(s) being delivered to a table by a staff member, a customer checking out, and clearing of a table used by a customer being completed.

The first time obtaining unit 51 executes a process of detecting occurrence of prescribed customer service events based on the image information provided by the cameras 1 capturing images of an interior of the restaurant, and obtaining an occurrence time of each prescribed customer service event. This first time obtaining unit 51 includes a customer status detection unit 61 and a table status detection unit 62. An occurrence time of a customer service event can be obtained from a time of image capture performed by the cameras 1 (a time of a frame of moving picture) which is added to each piece of image information.

The customer status detection unit 61 detects occurrence of customer service events relating to customers based on the image information provided by the cameras 1 capturing images of an interior of the restaurant, and obtains an occurrence time of each customer service event. Particularly, in the present embodiment, the customer status detection unit 61 detects, as customer service events, a customer entering the restaurant and a customer being seated at a table, and obtains the time when a customer enters the restaurant (entrance time) and the time when a customer is seated at a table (seating time). The entrance time and the seating time are obtained for each customer.

More concretely, when it is detected, based on the image information provided by the camera 1 set up to capture images at the doorway of the restaurant, that a customer has entered the restaurant (ST101 in FIG. 7), the entrance time is obtained from the time of image capture performed by the camera 1 at that point of time. Thereafter, based on the image information provided by the camera 1 set up to capture images at the doorway of the restaurant and the image information provided by the cameras 1 set up to capture images of areas where the tables are set, person tracking is performed from the doorway to the table at which the customer is seated (ST102 in FIG. 7). Then, when it is detected, based on the image information provided by some of the cameras 1 capturing images of the areas where the tables are set, that the customer has been seated at a table (ST103 in FIG. 7), the seating time is obtained from the time of image capture performed by the camera 1 at that point of time.

In the customer service event detection process executed by the customer status detection unit 61, known image recognition technology (face recognition technology, person tracking technology, etc.) may be used.

The table status detection unit 62 detects occurrence of customer service events relating to tables in the restaurant based on the image information provided by the cameras 1 capturing images of an interior of the restaurant, and obtains an occurrence time of each customer service event. Particularly, in the present embodiment, the table status detection unit 62 detects, as customer service events, delivery of a menu item(s) by a restaurant staff member to a table and completion of clearing of a table used by a customer, and obtains the time when a menu item(s) is delivered by a staff member (delivery time) and the time when clearing of a table is completed (clearing completion time). The delivery time and the clearing completion time are obtained for each table.

More concretely, when it is detected, based on the image information provided by some of the cameras 1 capturing images of the areas where the tables are set, that a menu item(s) has been delivered to a table by a staff member (ST104 in FIG. 7), the delivery time is obtained from the time of image capture performed by the camera 1 at that point of time. Then, when it is detected, based on the image information provided by some of the cameras 1 capturing images of the areas where the tables are set, that clearing of the table by the staff member has been completed (ST105 in FIG. 7), the clearing completion time is obtained from the time of image capture performed by the camera 1 at that point of time.

In the customer service event detection process executed by the table status detection unit 62, known image recognition technology (specific object recognition technology, etc.) may be used. For example, in background difference method, an input image is compared with a background image that has been captured when there is no object (such as a plate on which the meal is served) on a table, such that delivery of a menu item(s) to the table can be detected when an object appears on the table and completion of clearing of the table can be detected when the object disappears from the table.

The POS workstation 4 constituting the POS system includes a sales information storage unit 41, and occurrence times of prescribed customer service events are cumulatively stored in the sales information storage unit 41 as sales information together with the order content and payment content. Then, the occurrence times of the customer service events are notified from the POS workstation 4 to the second time obtaining unit 52 of the PC 3.

Specifically, when a restaurant staff member takes an order from a customer and enters the order content into the handy terminal 5 (ST401 in FIG. 7), the time when the staff member took an order from the customer (order taking time) is transmitted to the POS workstation 4 together with the order content, and is cumulatively stored in the sales information storage unit 41 as sales information. Then, the order taking time is transmitted from the POS workstation 4 to the second time obtaining unit 52 of the PC 3 (ST402 in FIG. 7).

Further, when the POS workstation 4 is operated by a restaurant staff member to perform checkout (ST403 in FIG. 7), the time when the checkout was performed (checkout time) is cumulatively stored in the sales information storage unit 41 as sales information together with the payment content. Then, the checkout time is transmitted from the POS workstation 4 to the second time obtaining unit 52 of the PC 3 (ST404 in FIG. 7).

The second time obtaining unit 52 executes a process of obtaining occurrence times of prescribed customer service events based on the sales information transmitted from the POS workstation 4. Particularly, in the present embodiment, the second time obtaining unit 52 obtains the order taking time and the checkout time (ST301 and ST302 in FIG. 7).

The time period information obtaining unit 54 executes a process of obtaining time period information relating to customer service status based on the occurrence times of customer service events obtained by the first time obtaining unit 51 and the second time obtaining unit 52. Specifically, in the present embodiment, the time period information obtaining unit 54 obtains various time periods, each being a time period elapsed from an occurrence time of a customer service event serving as a starting point to an occurrence time of a customer service event serving as an ending point, as required time periods relating to customer service.

It is to be noted that, to obtain accurate time period information relating to customer service status, it is necessary that the first time obtaining unit 51 and the second time obtaining unit 52 obtain pieces of time information based on the same reference time. In the present embodiment, the cameras 1 and the POS system are configured to operate based on the substantially same reference time using a conventional automatic time adjustment function, and therefore, accuracy of the time period information relating to customer service status can be ensured.

In the present embodiment, a time period required from the time a customer enters a restaurant to the time the customer is ushered to a seat (seating wait time), a time period required from the time the customer is seated at a table to the time an order is taken from the customer (order-taking wait time), a time period required from the time an order is taken from the customer to the time the ordered menu item(s) is delivered to the table (delivery wait time), a time period required from the time the customer places an order at the table to the time the customer leaves the table (customer dwell time), a time period required from the time the customer leaves the table to the time clearing of the table is completed (table clearing time), and a time period required from the time clearing of the table is completed to the time a next customer is seated at the table (table idle time) are obtained (ST201 to ST206 in FIG. 7).

In the process of obtaining a seating wait time (ST201 in FIG. 7), an entrance time and a seating time are obtained for each customer from the time information storage unit 53, and a time period elapsed from the entrance time to the seating time is calculated as a seating wait time.

In the process of obtaining an order-taking wait time (ST202 in FIG. 7), a seating time and an order taking time are obtained for each customer from the time information storage unit 53, and a time period elapsed from the seating time to the order taking time are calculated as an order-taking wait time.

In the process of obtaining a delivery wait time (ST203 in FIG. 7), an order taking time and a delivery time are obtained for each customer from the time information storage unit 53, and a time period elapsed from the order taking time to the delivery time is calculated as a delivery wait time.

In the process of obtaining a customer dwell time (ST204 in FIG. 7), an order taking time and a checkout time are obtained for each customer from the time information storage unit 53, and a time period elapsed from the order taking time to the checkout time is calculated as a customer dwell time relating to the table.

In the example described here, the customer dwell time is calculated as a time period from when the customer places an order at the table to when the customer leaves the table; namely a time period consisting of a delivery wait time and an eating time put together. However, it is possible to further add an order-taking wait time, such that the customer dwell time is calculated as a time period from when the customer is seated at a table to when the customer leaves the table.

In the process of obtaining a table clearing time (ST205 in FIG. 7), a checkout time of each customer and a clearing completion time of the table used by the customer are obtained from the time information storage unit 53, and a time period elapsed from the checkout time to the clearing completion time is calculated as a table clearing time relating to the table.

In the process of obtaining a table idle time (ST206 in FIG. 7), a clearing completion time of each table and a time when a next customer is seated at the table (seating time) are obtained from the time information storage unit 53, and a time period elapsed from the clearing completion time to the seating time is calculated as a table idle time relating to the table.

The totaling unit 55 executes a process of respectively totaling, for each time slot (predetermined time period), the various kinds of required time periods relating to customer service obtained by the time period information obtaining unit 54 (seating wait time, order-taking wait time, delivery wait time, customer dwell time, table clearing time, and table idle time) and obtaining various average required time periods for each time slot. In this totaling process, the various kinds of required time periods obtained for respective customers or for respective tables are respectively averaged for each time slot to obtain various average required time periods.

Further, the totaling unit 55 executes a process of respectively totaling, for each restaurant, the various kinds of required time periods relating to customer service obtained by the time period information obtaining unit 54 from a plurality of restaurants (seating wait time, order-taking wait time, delivery wait time, customer dwell time, table clearing time, and table idle time) and obtaining various average required time periods for each restaurant. In this totaling process, the various kinds of required time periods obtained for respective customers or for respective tables in each restaurant are averaged for each restaurant to obtain various average required time periods.

The output information generation unit 56 executes a process of generating output information representing an analysis result based on the time period information obtained by the time period information obtaining unit 54. Specifically, in the present embodiment, the output information generation unit 56 executes a process of generating analysis result screen information based on the average required time periods for each time slot (predetermined time period) and the average required time periods for each restaurant obtained by the totaling unit 55, such that an analysis result screen (see FIGS. 4 and 5) in accordance with the analysis result screen information is displayed on the display units 13 and 17 of the PCs 3 and 7.

It is to be noted that the customer service status analysis process described in the foregoing may be performed by obtaining the image information and the sales information from the recorder 2 and the POS system, respectively, at an appropriate timing. Thus, the customer service status analysis process may be performed every time the data necessary for executing the process of totaling for a predetermined time period (time slot) becomes available (for example, every time one hour lapses in the case where the totaling is performed on an hourly basis), or may be performed at a longer interval such that the analysis processes for different time slots are performed at the same timing. For example, it is possible to perform the process of totaling and analyzing on a daily basis such that the result of analysis of the customer service status for a given day may be available after closure of the restaurant on that day or on the following day.

Further, in the present embodiment, the seating wait time, order-taking wait time, delivery wait time, customer dwell time, table clearing time, and table idle time are obtained as required time periods relating to customer service, but various other kinds of required time periods may also be obtained. For example, a time period elapsed from a delivery time to a checkout time (table leaving time) may be obtained as an eating time.

In the present embodiment, the table leaving time is assumed to be substantially the same as the checkout time as shown in FIG. 6, but when the checkout counter is busy, it will take some time from when the customer leaves the table to when the customer checks out, and therefore, a time period elapsed from the table leaving time to the checkout time may be obtained as a checkout wait time. In this case, the first time obtaining unit 51 may obtain the table leaving time by detecting a customer leaving a table based on the image information provided by the cameras 1.

As described in the foregoing, in the present embodiment, it is possible to perform detailed analysis of customer service status by combining the information relating to customer service status obtained from the image information provided by the cameras 1 and the information relating to customer service status contained in the sales information provided by the POS workstation 4.

Namely, the occurrence times of customer service events contained in the sales information provided by the POS workstation 4 are obtained from the POS workstation 4 and the occurrence times of customer service events that cannot be obtained from the sales information provided by the POS workstation 4 are obtained from the image information provided by the cameras 1, and thus, it is possible to obtain occurrence times of more customer service events taking place in the restaurant. Therefore, it is possible to output a result of detailed analysis of customer service status, thereby allowing a user such as a manager of the restaurant to know the actual customer service status easily and in detail. Further, by identifying problems regarding customer service based on the actual customer service status and accordingly developing improvement measures, such as implementation of employee training programs or reassignment of staff members, it is possible to improve the customer satisfaction and streamline the operation of the restaurant, thereby increasing the sales and profit of the restaurant.

Further, in the present embodiment, the time period information obtaining unit 54 is configured to obtain a time period elapsed from an occurrence time of a customer service event serving as a starting point to an occurrence time of a customer service event serving as an ending point as a required time period relating to customer service, a user such as a manager of the commercial establishment is enabled to know the required time period relating to customer service. Of various kinds of required time periods relating to customer service, wait times for customers reduce customer satisfaction and may result in complaints from customers. Further, table idle times, along with the wait times for customers, can reduce the customer turnover rate of the restaurant. Therefore, knowing the actual state of wait times for customers and table idle times and developing improvement measures for reducing them can contribute to avoiding complaints from customers and improving customer satisfaction. Further, this can increase the customer turnover rate and streamline the operation of the restaurant, thereby increasing the sales and profit of the restaurant.

Further, in the present embodiment, the first time obtaining unit 51 is configured to obtain one of the occurrence time of the customer service event serving as a starting point and the occurrence time of the customer service event serving as an ending point, and the second time obtaining unit 52 is configured to obtain the other of the occurrence time of the customer service event serving as a starting point and the occurrence time of the customer service event serving as an ending point, and therefore, a required time period relating to customer service that cannot be obtained from only the sales information provided by the POS workstation 4, such as an order-taking wait time, delivery wait time, and table clearing time, can be obtained. It is to be noted that, in the present embodiment, a certain required time period relating to customer service, such as a seating wait time, can be obtained only from the times obtained by the first time obtaining unit 51, and another certain required time period relating to customer service, such as a customer dwell time, can be obtained only from the times obtained by the second time obtaining unit 52.

Further, in the present embodiment, the totaling unit 55 is configured to obtain an average required time period (e.g., order-taking wait time) for each predetermined time period (time slot), such that an analysis result screen (see FIG. 4) in accordance with the average required time period for each predetermined time period is displayed. This enables a user such as a manager of the restaurant to understand the characteristics of a change in the average required time period depending on the time slot. Therefore, it is possible to identify the time slot for which the required time period relating to customer service tends to be long and develop an improvement measure focusing on the time slot.

Further, in the present embodiment, the totaling unit 55 is configured to obtain an average required time period (e.g., order-taking wait time) for each restaurant, such that an analysis result screen (see FIG. 5) in accordance with the average required time period for each restaurant is displayed. This enables a user to compare the average required time periods of different restaurants and understand a difference in the average required time period between the restaurants. Therefore, it is possible to identify the restaurant for which the required time period relating to customer service tends to be long and develop an improvement measure focusing on the restaurant.

In the present embodiment, description was made of an exemplary case in which the invention was applied to a restaurant such as a casual dining restaurant. However, the present invention may be applied to a commercial establishment other than a restaurant.

Further, though in the present embodiment, description was made of an example in which the entirety of the customer service status analysis process was executed by the PC 3 set up at the restaurant as shown in FIG. 3, the entirety of the customer service status analysis process may be executed by another information processing device, such as the PC 7 set up at the management office or a cloud computer 21 forming a cloud computing system, as shown in FIG. 1, for example. Further, the customer service status analysis process may be executed by cooperation of multiple information processing devices, in which case, the multiple information processing devices are configured to be able to communicate or share information with each other via a communication medium such as an IP network or LAN or via a storage medium such as a hard disk or a memory card. Thereby, the multiple information processing devices jointly executing the customer service status analysis process constitute a customer service status analysis system.

In this case, it is preferred that the PC 3 set up at the restaurant be configured to execute at least the process to be executed by the first time obtaining unit 51. In such a structure, since the information obtained by the first time obtaining unit 51 has a small amount of data, even if the remaining processes are executed by an information processing device set up at a place other than the restaurant, such as the PC 7 set up at the management office, the communication load can be small, and thus, it is easy to operate the system in the form of a wide area network.

It may be also preferred that the cloud computer 21 be configured to perform at least the function to be performed by the first time obtaining unit 51. In such a structure, although the process performed by the first time obtaining unit 51 requires a large amount of computation, this is carried out by the information processing device constituting a cloud computing system, and therefore, it is not necessary to prepare a high-speed information processing device on the user side; namely at the restaurant or the like. Further, since the remaining processes require a small amount of computation, the remaining processes can be executed as extended functions of an information processing device set up at the restaurant to serve as the sales information management device, and this can reduce the cost born by the user.

The cloud computer 21 may be configured to execute the entirety of the customer service status analysis process. In such a structure, it becomes possible to view the analysis result on a mobile terminal such as a smartphone 22 in addition to the PC 3 set up at the restaurant and the PC 7 set up at the management office, and this allows a user to view the result of analysis not only at the restaurant or the management office but also at any other place, such as a place the user is visiting on business.

Further, though in the present embodiment, the PC 3 set up at the restaurant and the PC 7 set up at the management office are used to view the analysis result, it is possible to provide a browser device for viewing the analysis result separately from the PCs 3 and 7. For example, it is possible to use a smartphone 22 as a browser device for viewing the analysis result as described in the foregoing, or to provide the POS workstation 4 with a function of a browser device for viewing the analysis result. Further, though in the present embodiment, the analysis result is displayed on the display units 13 and 17 to enable a user to view the analysis result, it is possible to output the analysis result through a printer.

Yet further, though in the present embodiment, the time slots each having a duration of one hour define time periods for totaling as shown in FIG. 4, the time periods for totaling are not limited to the illustrated embodiment, and may have any duration such as one hour to several hours, one day to several days, one week to several weeks, one month to several months, etc., depending on the user needs.

The customer service status analysis device, customer service status analysis system and customer service status analysis method according to the present invention allow a user such as a manager of a commercial establishment to know the actual customer service status of the commercial establishment easily and in detail, and thus, are useful as a customer service status analysis device, customer service status analysis system and customer service status analysis method for performing analysis of the customer service status of a commercial establishment.

The contents of the original Japanese patent application(s) on which the Paris Convention priority claim is made for the present application as well as the contents of the prior art references mentioned in this application are incorporated in this application by reference.

The invention claimed is:

1. A customer service status analysis device for performing an analysis of a customer service status of a commercial establishment, the customer service status analysis device comprising:
 a processor; and
 a memory storing instructions,
 wherein the processor, when performing the instructions stored in the memory, comprises:
 a first time obtainer that detects an occurrence of a prescribed customer service event and obtains an occurrence time of the prescribed customer service event based on image information provided by an imaging device that captures images of an interior of the commercial establishment;
 a second time obtainer that obtains an occurrence time of a prescribed customer service event from a sales information management device that manages sales information;
 a time period information obtainer that obtains, as a required time period relating to a customer service, a time period between an occurrence time of a start point customer service event and an occurrence time of an ending point customer service event, based on the occurrence time of the prescribed customer service event obtained by the first time obtainer and the occurrence time of the prescribed customer service event obtained by the second time obtainer; and
 an output information generator that generates output information representing an analysis result based on the required time period obtained by the time period information obtainer,
 wherein the first time obtainer obtains one of the occurrence time of the start point customer service event and the occurrence time of the ending point customer service event, and the second time obtainer obtains the other of the occurrence time of the start point customer service event and the occurrence time of the ending point customer service event.

2. The customer service status analysis device according to claim 1, wherein:
 the first time obtainer obtains a time when a customer is seated at a table;
 the second time obtainer obtains a time when an order is taken from the customer by a staff member; and
 the time period information obtainer obtains an order-taking wait time as a time period between the time when the customer is seated and the time when the order is taken from the customer.

3. The customer service status analysis device according to claim 1, wherein:
 the second time obtainer obtains a time when a customer checks out;
 the first time obtainer obtains a time when clearing of a table used by the customer is completed; and
 the time period information obtainer obtains a table clearing time as a time period between the time when the customer checks out and the time when clearing of the table used by the customer is completed.

4. The customer service status analysis device according to claim 1, wherein:
 the second time obtainer obtains a time when a staff member takes an order from a customer;
 the first time obtainer obtains a time when the staff member delivers an ordered menu item to a table at which the customer is seated; and
 the time period information obtainer obtains a delivery wait time as a time period between the time when the order of the customer is taken and the time when the ordered menu item is delivered to the table.

5. The customer service status analysis device according to claim 1, wherein:
 the first time obtainer obtains a time when a staff member delivers a menu item ordered by a customer to a table at which the customer is seated;
 the second time obtainer obtains a time when the customer checks out; and
 the time period information obtainer obtains an eating time as a time period between the time when the menu item is delivered to the table and the time when the customer checks out.

6. The customer service status analysis device according to claim 1, further comprising a totaler that totals, for each predetermined time period, the required time period obtained by the time period information obtainer, and obtains an average required time period for each predetermined time period,
wherein the output information generator generates the output information based on the average required time period for each predetermined time period obtained by the totaler.

7. The customer service status analysis device according to claim 1, further comprising:
a totaler that totals the required time period obtained by the time period information obtainer from a plurality of commercial establishments such that the required time period is totaled for each commercial establishment, and obtain an average required time period for each commercial establishment,
wherein the output information generator generates the output information based on the average required time period for each commercial establishment obtained by the totaler.

8. A customer service status analysis system for performing an analysis of customer service status of a commercial establishment, the system comprising:
an imaging device that captures images of an interior of the commercial establishment;
a sales information management device that manages sales information; and
a plurality of information processing devices,
wherein the plurality of information processing devices jointly comprise:
a first time obtainer that detects an occurrence of a prescribed customer service event and obtains an occurrence time of the prescribed customer service event based on image information provided by the imaging device;
a second time obtainer that obtains an occurrence time of a prescribed customer service event from the sales information management device;
a time period information obtainer that obtains, as a required time period relating to customer service, a time period between an occurrence time of a start point customer service event and an occurrence time of an ending point customer service event, based on the occurrence time of the prescribed customer service event obtained by the first time obtainer and the occurrence time of the prescribed customer service event obtained by the second time obtainer; and
an output information generator that generates output information representing an analysis result based on the required time period obtained by the time period information obtainer,
wherein the first time obtainer obtains one of the occurrence time of the start point customer service event and the occurrence time of the ending point customer service event, and the second time obtainer obtains the other of the occurrence time of the start point customer service event and the occurrence time of the ending point customer service event.

9. The customer service status analysis system according to claim 8, wherein one of the information processing devices is at the commercial establishment and includes at least the first time obtainer.

10. The customer service status analysis system according to claim 8, wherein one of the information processing devices constitutes a cloud computing system and includes at least the first time obtainer.

11. A customer service status analysis method for performing an analysis of a customer service status of a commercial establishment by an information processing device set up inside or outside the commercial establishment, the method comprising:
receiving image information from an imaging device that captures an interior of the commercial establishment;
detecting an occurrence of a first prescribed customer service event and obtaining an occurrence time of the first prescribed customer service event based on the received image information;
obtaining an occurrence time of a second prescribed customer service event from a sales information management device that manages sales information;
obtaining, as a required time period relating to customer service, a time period between an occurrence time of a start point customer service event and an occurrence time of an ending point customer service event, based on the occurrence time of the first prescribed customer service event and the occurrence time of the second prescribed customer service event; and
generating output information, representing an analysis result based on the required time period,
wherein the obtaining of the occurrence time of the first prescribed customer service event obtains one of the occurrence time of the start point customer service event and the occurrence time of the ending point customer service event, and the obtaining of the occurrence time of the second prescribed customer service event obtains the other of the occurrence time of the start point customer service event and the occurrence time of the ending point customer service event,
wherein at least one of the receiving image information, the detecting an occurrence of a first prescribed customer service event and obtaining an occurrence time of the first prescribed customer service event, the obtaining an occurrence time of a second prescribed customer service event, and the generating output information is performed by a processor.

12. The customer service status analysis device according to claim 1, wherein the imaging device and the sales information management device operate based on a same reference time.

13. The customer service status analysis system according to claim 8, wherein the imaging device and the sales information management device operate based on a same reference time.

14. The customer service status analysis method according to claim 11, wherein the imaging device and the sales information management device operate based on a same reference time.

15. The customer service status analysis device according to claim 1, wherein the first time obtainer obtains the occurrence time of the prescribed customer service event from the image information using image recognition technology.

* * * * *